United States Patent [19]

Padamsee

[11] Patent Number: 5,178,724
[45] Date of Patent: Jan. 12, 1993

[54] METHOD OF MAKING A VACCUM VESSEL WITH INFRARED RADIATION PORTAL

[75] Inventor: Riaz A. Padamsee, Durham, N.C.
[73] Assignee: Eagle Flask, Inc., Durham, N.C.
[21] Appl. No.: 759,824
[22] Filed: Sep. 12, 1991

Related U.S. Application Data

[62] Division of Ser. No. 581,474, Sep. 12, 1991, abandoned.
[51] Int. Cl.⁵ .......................... B44C 1/22; C23F 1/00
[52] U.S. Cl. .................................. 156/643; 156/656; 219/121.69; 427/235; 427/238; 427/555
[58] Field of Search .............................. 156/643, 656; 219/121.68, 121.69, 121.85; 427/53.1, 231, 232, 234, 235, 238, 239

[56] References Cited

U.S. PATENT DOCUMENTS

| | | | |
|---|---|---|---|
| 1,498,837 | 6/1924 | Hale | 215/12.1 |
| 1,549,743 | 8/1925 | Bultman et al. | 215/12.1 |
| 1,566,221 | 12/1925 | Lindemuth | 215/12.1 |
| 1,760,378 | 5/1930 | Siegheim | 215/12.1 |
| 2,448,589 | 9/1948 | Gulick | 215/12.1 |
| 2,725,733 | 12/1955 | Davis | 220/420 |
| 4,356,381 | 10/1982 | Flaherty, Jr. et al. | 99/288 |

FOREIGN PATENT DOCUMENTS

| | | | |
|---|---|---|---|
| 3406918 | 9/1985 | Fed. Rep. of Germany | 215/13.1 |
| 4455 | of 1904 | United Kingdom | 222/131 |

Primary Examiner—William A. Powell
Attorney, Agent, or Firm—Fish & Richardson

[57] ABSTRACT

A method of making a double-walled vacuum container includes the steps of forming a double-walled container from gas-impermeable, radiation transmissive material with spaced-apart inner and outer walls that enclose an interior volume with a lacuna between the inner and outer walls; coating surfaces of the container walls that face the lacuna with a reflective coating; positioning the container in proximity to a source of coherent radiant energy; and removing selected portions of the reflective coating by impinging coherent radiant energy on portions of the reflective coating selected for removal.

14 Claims, 1 Drawing Sheet

METHOD OF MAKING A VACCUM VESSEL WITH INFRARED RADIATION PORTAL

BACKGROUND OF THE INVENTION

1. Field of the Invention

This invention relates generally to devices for containing a liquid and maintaining the contained liquid, such as coffee, at a fairly constant temperature, and to methods for maintaining liquids within a desired temperature range using such devices. Such devices include insulated flasks and vacuum bottles which maintain the temperature of the liquid stored within such flasks or vacuum bottles by imposing a thermal barrier which reduces the rate of transmission of heat into or out of the container, and heater/flask systems, such as electric coffee makers, which, through the use of a resistance heater and either a glass or metal flask, maintain the temperature of the stored liquid by introducing heat to pre-heat the flask and subsequently, to heat the liquid in the flask.

2. Description of the Related Art

Although the device of the present invention is derived from and most closely related to the vacuum flask or bottle, unlike ordinary vacuum flasks, the device is adapted for use in hot beverage brewing and warming systems, such as those used to brew coffee or tea. In particular, the device relates to that portion of the art concerned with maintenance of the temperature of the brewed beverage, rather than heating of water and brewing the beverage. Most coffee and tea brewers on the market consist of a heating chamber into which cold water is introduced, a brewing chamber in which the coffee grounds or tea leaves are placed, a delivery system which introduces the heated water into the brewing chamber, a storage flask in which the freshly brewed beverage is collected and a system for maintaining the temperature of the collected beverage within the storage flask. This invention relates to the system for maintaining the temperature of the collected beverage within the storage flask.

Ordinary silvered glass vacuum flasks are not often used as collection devices in such systems, since, although they are able to slow the cooling of the beverage due to their insulating properties, these very insulating properties usually prevent heat from being introduced into the flask from an external heat source, thus lessening the desirability of using vacuum flasks in such systems. Because of the inability to efficiently introduce heat into the vacuum flask once the liquid is placed in it, the amount of time during which the liquid can be maintained at the desired temperature in a vacuum flask is a direct function of the flask's insulating properties and is thus limited.

In the present state of the art, the preferred storage flask in beverage brewing systems is made of single-walled, heat resistant glass. The temperature of the brewed beverage within the storage flask is maintained by an electric resistance heating element imbedded within or placed directly underneath a conductive platform on which the storage device rests. Higher-priced models have higher quality heating elements, thermostatic controls or more efficient conducting materials in the platform to create a more constant and even distribution of heat across the surface of the platform on which the storage flask rests.

Variations currently in existence include systems in which the heating element is integrated into the storage flask and systems in which an insulating jacket is wrapped around the storage flask. The combination of storage flask with heating element allows for a more efficient thermal coupling between the storage flask and the heating element. Often the integrated system also includes an insulated jacket surrounding the storage flask, to increase the unit's efficiency by reducing the amount of heat which must be introduced to maintain a constant temperature.

The advantages obtained by integration of the storage flask and heating element are offset by several disadvantages. First, the integrated device is more difficult to clean. If the flask/heater is made sufficiently waterproof to allow for immersion cleaning, the cost of manufacture rises significantly. Finally, the cost of replacement parts is increased. The storage flask is the most often broken part of the system. Where the storage flask is integrated with a heating element, the cost of replacement is increased. Further, commercial coffee brewers often have replaceable heating platforms. Integration of the heating element into the storage flask makes replacement of broken or defective heating elements more difficult and costly. In general, integrated systems as described in the previous paragraph tend to be preferred only when the need for portability and compactness outweigh these disadvantages.

As discussed above, prior to the present invention, use of double-walled vacuum flasks in hot beverage brewing and storage systems was inefficient due to the difficulties of introducing heat into such flasks. However, some systems attempt to reduce the amount of heat required to maintain the temperature of the brewed beverage in the single-walled storage flask by surrounding the flask on its vertical surfaces with an insulating jacket. Use of an insulating jacket surrounding the exterior surface of the storage flask provides some of the advantages of a vacuum bottle but with a significantly less efficient thermal barrier.

A disadvantage of temperature maintenance systems employing electric resistance elements, which to applicant's knowledge are employed in all hot beverage brewing/storage systems, in conjunction with single-walled storage flasks is that such heating systems tend significantly to accelerate the degradation of aroma and taste qualities of the stored hot beverage. In coffee, for example, many of the components of the taste and aroma of the beverage are heat labile. While a certain loss of taste and aroma over time is inevitable when the beverage is stored in an open container due to the volatility of certain taste components, this degradation of taste and aroma occurs much more rapidly in systems where temperature is maintained by introducing heat via electric resistance heating elements to compensate for the large heat losses in a non-insulated or poorly insulated, single-walled storage flask.

The increased rate of flavor deterioration is a function of the localized high temperature to which the stored beverage nearest the surface of the heating element is subjected and the amount of time the stored beverage is subjected to elevated temperature. In order to keep the liquid in the flask at a selected elevated temperature, the heating element must be at a significantly higher temperature than that desired for the heated beverage. The bottom (and/or side) of the flask which is in contact with the heating element is also at a higher temperature than that desired for the liquid. As the heat is conducted through the flask wall into the contained liquid, a thermal gradient is established, with the liquid directly adjacent to the heated flask wall being conductively heated to a higher temperature than that of the liquid as a whole. Although convection currents within the liquid dissipate the heat and limit the period of time when any particular portion of the liquid is exposed to the heated flask wall, such convection currents also assure that virtually all of the liquid has some exposure to temperatures significantly higher than the desired maintenance temperature of the hot beverage. This exposure of the liquid to the high temperature zone of the flask wall causes increased degradation of the heat labile elements of the beverage.

Units using insulated jackets on the storage flasks will maintain the heated beverage for a longer period of time without unacceptable degradation of flavor than will those without insulated jackets. The reason for this increased performance is that the heating elements used with storage flasks which have insulated jackets can maintain the desired storage temperature while set at a lower temperature or by introducing heat less frequently. Because flavor degradation is a function of prolonged exposure to high temperature, the ability of these devices to use a lower temperature or to introduce heat less frequently reduces the rate of degradation. Unfortunately, as discussed above, units employing flasks with insulation jackets are more expensive to manufacture and more difficult to clean. Furthermore, cost of replacement flasks is higher.

Systems employing electric resistance conduction heating of a single-walled storage flask, including those with insulating jackets, have a further disadvantage in that the heating elements employed often heat unevenly with localized "hot spots". These localized areas create corresponding hot spots on the heating platforms and on the adjacent flask wall and expose the beverage contained in the flask to even greater temperatures than those required to maintain the temperature of the liquid. These hot spots result in more rapid deterioration of the taste and aroma elements of the stored beverage and occasionally introduce off-flavor elements by causing burns or scorching of the beverage.

One alternative to electrical resistance heating is microwave heating. Unfortunately, microwave heating also has significant disadvantages. The short wavelength microwave radiation generated by conventional microwave warming devices typically penetrates only about one-half inch into aqueous liquids. Thus microwave heaters also heat liquid unevenly, creating a "hot zone" near the surface of the liquid closest to the microwave source and depending on thermal currents in the liquid to distribute the heat throughout the liquid. Although microwave heating may not create the local zones of extremely high heat that electric resistance heat creates, it does heat liquids unevenly and the resulting hot zones can hasten the destruction of flavor and aroma elements in the heated beverage. In addition to the indirect, thermal effect mentioned above, microwave radiation also has a direct effect on many complex flavor molecules present in brewed beverages. Microwaves heat liquids by inducing translational and rotational vibrations in susceptible molecules and portions of molecules which absorb microwaves. The absorption of microwave radiation in itself can hasten the destruction of these molecules causing the flavor of the beverage to deteriorate. Microwave heating has a further disadvantage in that unshielded or poorly shielded microwave heat sources can be hazardous to the user.

Microwaves have been linked to cataract development and can create interference with pacemakers. Thus, the design of a beverage warmer utilizing a microwave heat source requires that the adequate shielding be incorporated. The necessity of including adequate shielding as well as the relatively high cost of microwave heating elements are likely to create a cost disadvantage for devices containing microwave heat sources.

Accordingly, it would be a significant advance in the art to provide a means for storing hot beverages in a highly efficient insulating vacuum container, without the cost and convenience drawbacks associated with storage containers with insulating jackets, in combination with a means for introducing heat into the vacuum flask and for preheating the walls of the flask prior to receiving the liquid. Such heat introduction means would desirably introduce heat into the contained liquid in a manner which avoids more than a transient exposure of the beverage to surfaces at elevated temperature, which avoids the risk of hot spots on flask surfaces in contact with the beverage, and which avoids hot zones and substantial thermal gradients in the beverage itself.

It therefore is an object of the present invention to provide a means for storing hot liquids (or other substances) in a vacuum flask, a means for preheating the vacuum flask walls prior to receiving the hot beverage, and a means for maintaining the temperature of the hot liquids by introducing additional thermal energy into the liquid (or other substance) in the flask via input of infrared radiation via an infrared input portal in the vacuum flask.

It is also an object of the invention to provide a method for forming infrared input portals in double-walled vacuum flasks.

To my knowledge, the prior art is devoid of vacuum flasks utilizing infrared radiation portals and infrared heat sources to maintain the temperature of the contained liquid. A process is disclosed in Japanese Kokai Tokyo No. 81,46,553 issued Nov. 4, 1981 to Zojirushi Vacuum Bottle Co. Ltd. for creating a window in a vacuum bottle for the purpose of viewing the level of liquid inside. The process disclosed in this Japanese patent differs greatly from the processes disclosed herein. Further, the Japanese patent makes no mention of using the viewing window in any way for heating the contents of the vacuum flask.

SUMMARY OF THE INVENTION

The present invention relates generally to (1) a beverage storage vacuum flask with at least one infrared radiation portal allowing for the introduction of infrared radiant energy to the flask's walls and the flask's contents; (2) to a brewed, hot beverage system comprising such a vacuum flask, together with means for introducing infrared radiation to pre-heat the flask's walls and subsequently heat its contents; (3) to a method for brewing, collecting and storing hot beverages and maintaining the temperature of hot beverages using such a system; and (4) to methods of manufacturing a double-walled vacuum vessel with infrared radiation portals.

Other aspects and features of the invention will be more fully apparent from the ensuing disclosure and appended claims.

DETAILED DESCRIPTION OF THE INVENTION, AND PREFERRED EMBODIMENTS THEREOF

Figure 1:
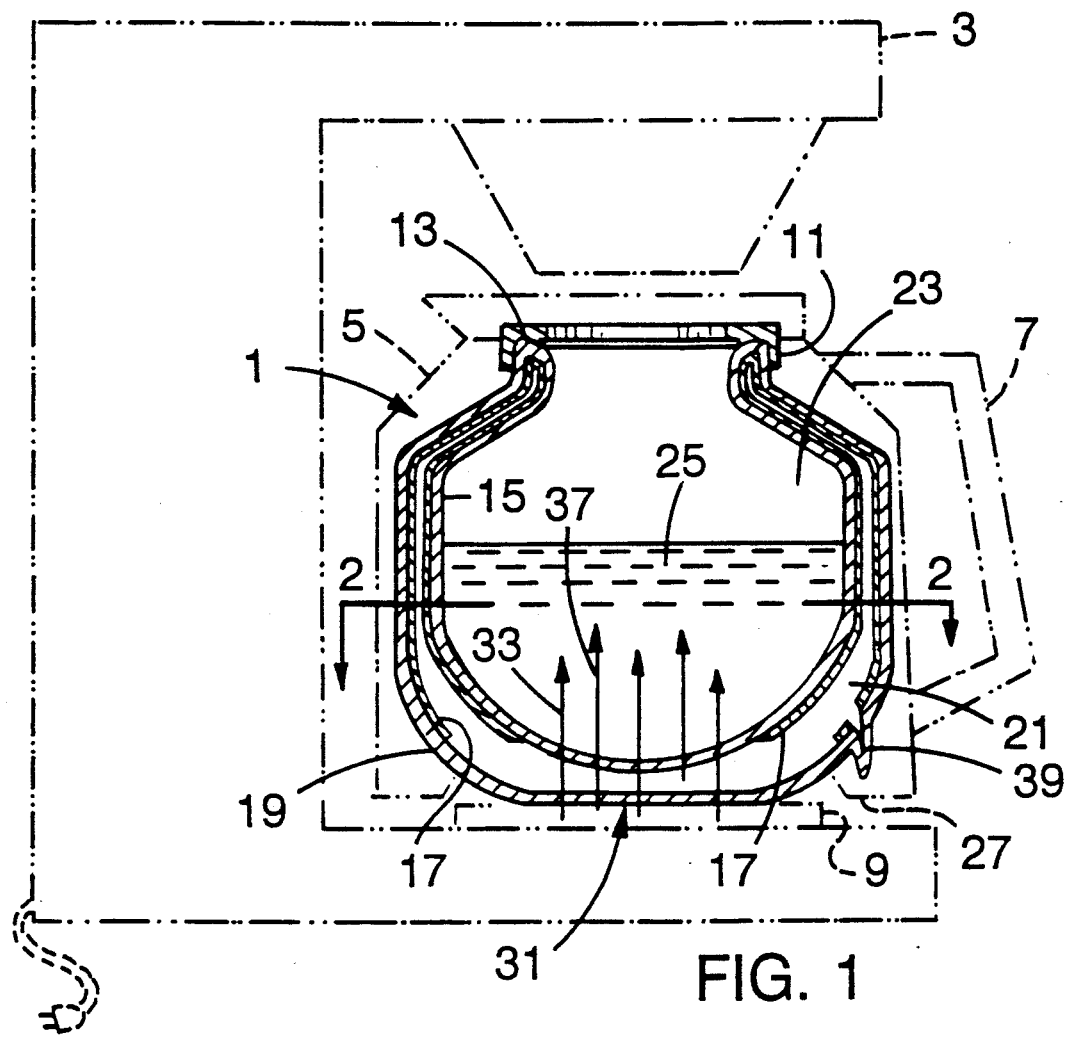
FIG. 1 is a side elevation view of a hot beverage brewing and warming system incorporating a double-walled vacuum flask with an infrared radiation portal on the bottom of the flask, and an infrared source positioned directly under the infrared portal.

The present invention achieves a significant advance in the hot beverage art in the provision of a vacuum flask with an infrared radiation portal.

Double-walled glass flasks as discussed hereinearlier are old and well-established in the art. The method customarily employed for preparing glass vacuum flasks involves the formation of a double-walled glass flask containing a small flow passage through which material can be introduced into the lacuna between the flask's interior and exterior walls and through which the lacuna can be evacuated. After which the small flow passage is sealed. The design and appearance of containers of such type is old and well-known in the art. In one example of vacuum vessels of such type, the glass double-walled container is roughly spherical in shape, with a flattened bottom and an opening at the top which is surrounded by a lip.

In the prior art, coatings which reflect radiant heat are often deposited on the interior walls of the double-walled flask to increase the efficiency of the flask's thermal barrier. The prior art reveals numerous ways in which reflective coatings can be deposited on the interior walls of double-walled glass containers. A flask with an infrared radiation portal can be formed, according to the present invention, by providing an infrared reflective coating on the interior walls of the double-walled container, except in the area or region selected to be the infrared radiation portal, using any suitable conventional methods now known or hereafter discovered for applying infrared reflective coatings to substrates or surfaces, e.g., methods wherein a infrared reflective coating, such as a metallic coating, is deposited from a solution of a reflective coating constituent. Such deposition methods per se are old in the art.

The following deposition method is given as an example: A stannous chloride activating sensitizing solution is introduced into the lacuna between the two walls of a double-walled flask through a flow passage communicating with the lacuna, and the flask is agitated until the entire interior facing surfaces of the flask's walls are wetted. The stannous chloride solution is drained from the lacuna through the flow passage, and equal quantities of a silver nitrate solution and a reducing solution are added to the lacuna.

The silver nitrate solution and the reducing solution are left in the flask lacuna for ten minutes and then drained. The flask lacuna is then rinsed. Activating or sensitizing solution, silver nitrate solution and reducing solution are commercially available from London Laboratories, Ltd., 15 Lunar Drive, Woodbridge, Conn. 06525.

Two preferred methods have been developed in the practice of the invention for the selective deposition of a (infrared) reflective coating on the inner facing walls of a double-walled flask. Both methods leave a selected portion of the inner facing walls uncoated, thus creating an uncoated, or partially uncoated, infrared radiation portal in an otherwise coated double-walled flask.

An example of the first method is as follows: When it is desired to create the infrared radiation portal on the bottom of a flask, one can begin with an uncoated, double-walled flask with a flow passage at the joining of the side walls and the bottom walls. The flask is inverted, and the coating solution and/or the flask is cooled and then subjected to a coating process as described above, with application of a stannous chloride solution first, followed by the introduction of the silver nitrate coating solution and the reducing solution being introduced into the lacuna between the two walls of the double-walled flask through the flow passage. When the coating and reducing solutions are introduced into the lacuna, the lacuna is filled with equal quantities of the two solutions, leaving only the flask bottom portion (which is the top portion in this inverted position) unexposed to the coating solution. After the coating solution is exhausted, it is removed through the flow passage. The flask is then rinsed, dried and sealed in the usual way. The flask is heated after rinsing to dry the coated facing interior walls. The lacuna is then evacuated through the flow passage by means of a vacuum pump and the flow passage is sealed by melting, leaving the lacuna between the walls in a vacuum condition.

In this method, the chilling of the solution and/or the flask reduces the rate of deposition. Such a reduction in rate of deposition minimizes uneven deposition due to the "splashing" which may occur as the deposition liquid is introduced into the flask. Chilling the deposition solution and/or the flask reduces the speed of deposition and creates a greater degree of sharpness of the edge between the reflective coating and the uncoated portal. With small modifications, this technique can be used to create an infrared radiation portal virtually anywhere on the vacuum flask. The advantage of this method is that it is economical and requires no special machinery to accomplish. However, one disadvantage of this technique is that it is difficult using this technique to create a vacuum flask with more than one portal. A second disadvantage of this technique is that it cannot be used to create any complex pattern or patterns of coated areas and uncoated areas.

The second method for creating partially coated interior facing walls in a vacuum flask, involves the use of a programmable laser. The advantage of the technique is that it is much more versatile, allowing creating an almost infinite variety of patterns of coated and uncoated areas. In this second method, the unsilvered portal is created by starting with a flask with a complete, uniform deposition of the reflective coating on the entire surfaces of the interior facing walls. The layer of reflective coating material is then removed from precisely selected areas of the flask by moving a beam of coherent radiant energy along a predetermined path over the areas selected for removal, while providing sufficient intensity of coherent radiant energy to cause the layer of reflective coating which is in the beam path to ablate. When the coherent radiant energy is provided by a programmable etching laser, an infinite number of patterns of coated and uncoated areas can be generated, ranging from a simple clear circle or "portal" to complex grid patterns, figures, logos, words or other images. The coated flask is positioned on a platform with the area where the pattern is desired facing a programmable laser source. The laser is programmed to trace a pattern coextensive with the desired pattern at a desired power level. The laser is directed at the flask and the program is executed. The execution of the program causes the laser to be aimed at the flask in a high-resolution scan mode which causes the ablation of the deposited reflective coating, leaving clear glass in a programmed pattern.

The above-described lasing technique is useful for creating areas of clear glass of any pattern, size, shape or location within the reflective coating deposited on the inner facing walls of the vacuum flask. The intensity of the laser beam can be adjusted so that the beam will ablate the coating on one facing wall, both facing walls, or through the interior space of the vacuum flask, ablating the coating on three or all four of the glass walls which are in the path of the beam. Where the laser is to be used at a high intensity, but it is not desired for the pattern to be created on the walls on the opposite side of the interior volume of the flask from the laser source, a light-absorbing buffer material can be placed in the interior of the flask prior to the laser treatment to absorb any laser light which penetrates through both coatings and glass walls into the interior volume of the flask. Use of such material will prevent removal of the reflective coatings on the walls which are opposite the interior flask volume from the laser source.

This technique is useful not only for creating infrared portals, but is also useful for creating non-coated areas in the vacuum flask for other purposes. For example a clear, long narrow window containing reflective scale markings can be created on the side of the flask for purposes of viewing the liquid and measuring the volume of liquid in the flask. The technique can also be used to etch or ablate into the flask the trademark or logo of the manufacturer or vendor of the flask or for creating decorative or informational patterns in the flask by selective removal of reflective coating.

When this second technique is used for creation of infrared portals, it has the advantage over the first technique of allowing variable removal of the reflective coating from the infrared portal area. For example, because the infrared portal is both a portal for the entry and exit of infrared energy, a partially reflective and partially non-reflective gridwork of coated and clear areas within the "portal" may maximize the effectiveness of the portal for both introducing infrared energy into the flask and reducing the emission of infrared energy out of the flask. The grid pattern and the relative portions of clear and reflective areas within the portal can be adjusted to optimize conditions for each application. The spacing, thickness and design of the clear and coated areas within the portal may be adjusted to compensate for variations in the volume of the flask, the size, wattage and efficiency of the infrared source, the ratio of the flask volume to infrared source area and the desired maintenance temperature for the particular application for which the flask is designed.

The technique requires a laser emitting light at a wavelength to which the glass walls of the flask are transparent, but not to the reflective coating. With the type of glass which I have used, I have found the nd:YAG laser (neodymium-doped Ytterium, Aluminum, Garnet laser), such as the InstaMark Elite (TM) Q switched YAG Laser, manufactured by Control Laser Corporation, 7503 Chancellor Drive, Orlando, Fla., to be effective. If the flask walls contain substances which absorb light at the wavelength normally emitted by the YAG laser, lasers with other wavelengths may be preferable. It may also be possible to use the wave frequency doubling feature of the InstaMark laser or other nd:YAG lasers to avoid the absorption problem. This may also reduce any reflection from the metallic coating that is being ablated. The lasing technique can be used before or after the flask is evacuated and sealed, although the process may be most efficient when performed on an evacuated, sealed flask. Where large amounts of coating are to be removed by this method, it may be desirable to perform the ablation prior to permanent sealing of the flask to allow a cleaning solution to be introduced after ablation to flush out the material which has been removed by the process.

It is noted that the open top of the vacuum flask is, of course, transparent to infrared radiation and, therefore, is a second infrared radiation input portal. With appropriately positioned infrared sources, the open top, as well as the fully or partially uncoated portion of the flask wall or bottom, can be used as a portal for introducing infrared radiation into the vessel. In most applications, the open top of the flask is fitted with a removable top which is placed on the flask when it is removed from the brewing apparatus. Some models have tops which engage the brewing apparatus to allow for the introduction of the brewed beverage into the interior volume of the flask. Some of these tops seal the top when removed from the brewing apparatus. Because the flask shown in the drawings is shown on the brewing apparatus, no separate top is illustrated.

The uncoated portions of the glass inner and outer walls of the vacuum flask may function both as transmissive structures and absorptive, secondary emitters of infrared radiation in the process of transmitting heat to the interior volume of the flask by means of infrared radiation. While not wishing to be bound by theory or mechanism of operation, it appears that the glass I have used in making vacuum flasks is substantially infrared absorbent in our range of operation (below one hundred fifty degrees Celsius), and that, as the outer wall of the vacuum flask heats up through convective, conductive and radiant heating, the outer wall also becomes a source, or secondary emitter, of infrared radiation.

The significance of the outer wall's secondary role as a transmitter of infrared heat is increased by the fact that infrared heat sources generally are not "single mode" heat sources. That is, infrared heat sources also generate some heat in forms other than radiant energy. These other forms of heat, conductive and convective heat, serve to increase the warming of the outer wall of the portal, thus increasing the efficiency of the infrared portal by increasing the amount of infrared heat it transmits and causing it to become a secondary emitter of infrared radiation. Thus the outer wall plays a significant role in increasing the efficiency of the transmission of infrared, radiant heat to the flask's interior.

Because of the efficiency of the insulating properties of the vacuum in the lacuna between the inner and outer walls of the vacuum flask, the inner wall and the flask's interior volume can be significantly heated from the outside by infrared radiation. The inner wall is separated from the outer wall by a vacuum. It receives virtually no conductive or convective thermal energy. However, infrared energy travels effectively through the vacuum. When the portal is positioned on the bottom of the flask, the portal's inner wall is also in constant contact with the liquid contents of the flask. These two factors can allow significant warming of the inner portal wall as it absorbs infrared energy and also allow heating of the flask contents by transmission of radiant energy by and through the inner portal wall. The infrared energy can originate from the external heat source or the outer wall of the vacuum flask or from both.

The ability of the outer glass wall to act as an emitter of infrared radiation as well as a lens through which radiant energy passes is an important consideration in the design and placement of heating elements. It suggests that the infrared source will be most efficient in providing heat to the flask interior if the infrared portal is on the bottom of the flask and the infrared source is immediately below the flask, to maximize convective heat transfer, and in contact with it to maximize conductive heat transfer. This position allows the outer wall of infrared portal to capture more of the non-radiant heat and enhances its role as an emitter of infrared radiation. This design is also desirable in that the surface of the inner portal wall which faces the flask interior is more likely to be in contact with the flask contents with this positioning of the portal.

The vacuum vessel may be placed in a metal or plastic housing which surrounds the walls of the vessel provided the housing is either opened or infrared transparent immediately adjacent to the infrared portal in the vacuum vessel. Techniques for securing a vacuum flask in a housing are old and form no part of the present invention. For example, the flask may be secured in the housing by means of a screw-in bottom supporting ring or top supporting ring. The top portion of the housing may be connected to the bottom portion by means of a snap-in lip or glued together. Some housings are designed for easy removal and replacement of the vacuum flask, others are permanent. Usually, the top of the vacuum flask is surrounded by a lip gasket to form a water-tight seal between the lip of the vacuum flask and the housing. Many brewing machines include a separate top to be inserted on the flask and its housing (if any) for storing liquid after brewing when the flask is removed from the brewing platform.

Infrared radiation is introduced through the infrared portal of the flask by means of an infrared source such as a black-body radiator or an infrared lamp. Many resistance heaters, such as those currently used on coffee brewing machines, are also excellent black-body infrared radiators. The manufacture of such radiators and lamps is old and well-known in the art. Such an infrared source can be placed in the platform of the device. Where lamps are used, the source may be protected from breakage by use of an unbreakable infrared lens or secondary transmitter which will act either as an infrared transparent portal or as an intermediary which absorbs and retransmits the infrared radiation emanating from the lamp. Where the infrared portal in the vacuum flask is in the flask bottom, the lens or secondary transmitter can function as an integral element of the vacuum flask support platform. Where black-body radiators are used, the radiator itself can function as the vacuum flask support platform.

Referring now to the drawings, FIG. 1 shows a vertical cross-section through a double-walled vacuum flask 1 containing an illustrative embodiment of the infrared portal. The brewing apparatus 3, flask housing 5, handle 7, and infrared radiator 9 are represented by dotted lines. The top of the flask is connected to the housing by means of a sealing lip gasket 11 which surrounds the lip 13 of the double-walled vacuum flask 1. In addition to the flask lip 13, the flask comprises an inner wall 15, partially coated with a reflective coating 17, an outer wall 19, partially coated with a reflective coating 17, an evacuated lacuna 21 between the inner and outer walls, and an enclosed volume 23.

In the flask as shown in the drawing, the enclosed volume 23 is partially filled with a liquid beverage 25. The flask is supported within the housing by the curvature of the housing underneath the flask, so that a retaining portion of the housing 27 is created. The retaining portion of the housing has an inner circumference less than the outer circumference of the enclosed flask. As discussed above, the retaining portion may or may not be removable.

The outer wall 19 of the vacuum flask is flattened on the bottom portion so that it may rest upon an external infrared radiator 9. The bottom portions of both the outer wall and the inner wall are partially or totally free of reflective coating, creating an infrared portal 31. Note that the infrared portal is an infrared portal between the infrared source outside the flask, and the enclosed volume or between the infrared emitting outer wall and the infrared absorbing inner wall. The portal is comprised of the corresponding, superimposable, coating-free (or reduced coating) areas of the inner wall 15 and the outer wall 19. A coating-free (or reduced coating) area merely on a single wall would not allow passage of infrared radiation into the flask from an external source and is not an infrared portal.

Primary infrared radiation 33 emanating from the external primary infrared radiation source 9 impinges on the infrared portal 31 and infrared radiation is transmitted to and absorbed by the liquid beverage 25 within the flask. Because the outer wall is heated by heat energy created by the primary infrared radiation source, it becomes a secondary infrared emitter. Thus, secondary infrared radiation 37 is emitted by the outer wall 19 of the flask, passes by means of the infrared portal 31, and is absorbed by the inner wall 15 of the flask.

FIG. 1 also shows the flow passage 39 through which the deposition medium may be introduced into the lacuna. In the completed flask the flow passage is sealed, usually by melting.

Figure 2:
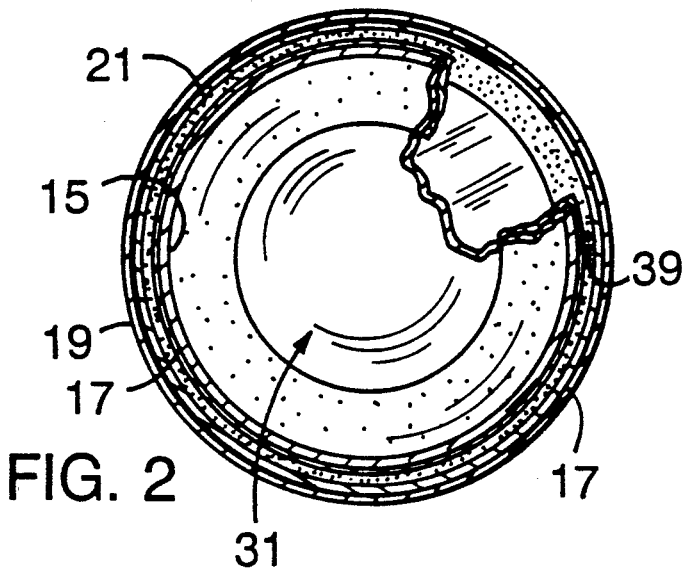
FIG. 2 is a plan view, partially broken away, of the lower half of the FIG. 1 vacuum flask along section 2—2 thereof, showing the infrared portal and the lacuna between the interior and exterior walls of the double-walled vacuum flask.

FIG. 2 is a plan view, partially broken away, of the lower half of the vacuum flask shown in FIG. 1 along the cross sectional line 2—2. In FIG. 2, the inner wall 15, outer wall 19, evacuated lacuna 21, reflective coating 17, flow passage (sealed) 39 and infrared portal 31 are shown. A portion of the inner wall 15 is removed to reveal the reflective coating on the outer wall. Notice that the coating free area of the outer wall is greater in circumference than that of the inner wall and the border between the reflectively coated portion and the coating-free portion of the outer wall. This indicates that the infrared portal in the pictured flask was created using the first method discussed above.

What is claimed is:

1. A method of making a double-walled vacuum container with an infrared portal, comprising:
   a. forming from a gas-impermeable, infrared transmissive or absorbent material a double-walled container with inner and outer walls of the container disposed in spaced-apart relationship to one another and enclosing an interior volume, with lacuna between the inner and outer walls which is in communication with the surroundings through a flow passage;
   b. placing the container in a position where the center of that portion of the inner and outer walls which is to form the infrared portal is at an upper elevation;

c. introducing into the lacuna a solution containing an infrared opaque, reflective coating constituent, in an amount sufficient to coat the interior container walls except for portions thereof at the upper elevation;

d. retaining the solution in the container until its ability to deposit the coating is exhausted;

e. removing any remaining deposition liquid from the lacuna through the flow passage; and f. evacuating the lacuna and sealing the flow passage.

2. A method according to claim 1, wherein said solution containing an infrared reflective coating constituent is chilled prior to introduction into the lacuna of the double-walled container.

3. A method according to claim 1, wherein said double-walled container is chilled prior to introduction of said solution into the container.

4. A method according to claim 1, wherein both said container and said solution are chilled prior to the introduction of the solution into the container.

5. A method of making a double-walled vacuum container, comprising:

a. forming a double-walled container from gas-impermeable, radiation transmissive material with inner and outer walls of the container disposed in spaced-apart relationship to one another and enclosing an interior volume, with lacuna between said inner and outer walls which is in communication through a flow passage with the surroundings;

b. coating surfaces of said container walls that face said lacuna with reflective coating material;

c. positioning said container with an area of said reflective coating material selected for removal in proximity to a source of coherent radiant energy;

d. removing said selected area of said reflective coating material by impinging coherent radiant energy from said source on said selected area of said reflective coating material until said selected area of said coating material has ablated.

6. A method according to claim 5, wherein said selected removal of portions of the reflective coating by means of coherent radiant energy comprises the use of a programmable means for positioning the coherent radiant energy source in relation to the container wall.

7. A method according to claim 5, wherein said selected removal of portions of the reflective coating by means of a coherent radiant energy comprises the use of a programmable means for positioning the container wall in relation to the coherent radiant energy source.

8. A method according to claim 5, wherein said coherent radiant energy source is a Ytterium, Aluminum, Garnet (YAG) laser.

9. A method according to claim 5, wherein said coherent radiant energy source is a neodymium-doped Ytterium, Aluminum, Garnet (nd:YAG) laser.

10. A method according to claim 5, wherein said container is evacuated and sealed prior to the selective removal of the reflective coating.

11. A method according to claim 5, wherein said container is not evacuated or sealed prior to the selective removal of the reflective coating and wherein after laser ablation, a mild acid solution is introduced into the lacuna of the container to remove any residual, ablated material, and the mild acid solution is removed prior to evacuation of the lacuna and sealing of the flow passage.

12. A method according to claim 5, wherein a coherent radiant energy absorbing material is placed within the interior volume of the container prior to use of the laser.

13. A method according to claim 5, wherein a portion of the reflective coating is removed to form a view window to visually discern the level of the contents of the enclosed volume of the container.

14. A method according to claim 5, wherein portion(s) of the reflective coating are removed to form informational or decorative writing or designs.

* * * * *